United States Patent
Murakami et al.

(10) Patent No.: US 9,389,616 B2
(45) Date of Patent: Jul. 12, 2016

(54) DRIVING FORCE CONTROL DEVICE FOR FOUR-WHEEL-DRIVE VEHICLE

(75) Inventors: Ryuichi Murakami, Wako (JP); Jiro Hara, Wako (JP); Nor Hairuddin, Wako (JP); Yusuke Sakaguchi, Wako (JP); Naoharu Takatani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 205 days.

(21) Appl. No.: 14/237,602

(22) PCT Filed: Jun. 12, 2012

(86) PCT No.: PCT/JP2012/065020
§ 371 (c)(1),
(2), (4) Date: May 12, 2014

(87) PCT Pub. No.: WO2013/021724
PCT Pub. Date: Feb. 14, 2013

(65) Prior Publication Data
US 2014/0297146 A1 Oct. 2, 2014

(30) Foreign Application Priority Data
Aug. 10, 2011 (JP) ................. 2011-175445

(51) Int. Cl.
*G05D 17/02* (2006.01)
*B60K 23/08* (2006.01)
(Continued)

(52) U.S. Cl.
CPC ............ *G05D 17/02* (2013.01); *B60K 23/0808* (2013.01); *B60K 28/165* (2013.01); *B60K 17/351* (2013.01); *B60W 2510/20* (2013.01); *B60W 2510/207* (2013.01)

(58) Field of Classification Search
None
See application file for complete search history.

(56) References Cited

U.S. PATENT DOCUMENTS

2004/0222029 A1   11/2004   Shigeta et al.
2007/0151790 A1*  7/2007   Thompson ......... B60K 23/0808
                                                            180/247
(Continued)

FOREIGN PATENT DOCUMENTS

EP   1 990 230 A2   11/2008
JP   04-154437 A    5/1992
(Continued)

OTHER PUBLICATIONS

Extended European Search Report dated Aug. 20, 2015, issued in counterpart European Patent Application No. 12822685.9 (6 pages).
Office Action dated Aug. 4, 2015, issued in counterpart Chinese Patent Application No. 201280038533.8 w/English translation (9 pages).
(Continued)

*Primary Examiner* — Edwin A Young
(74) *Attorney, Agent, or Firm* — Westerman, Hattori, Daniels & Adrian, LLP

(57) ABSTRACT

Provided is a driving force control device for a four-wheel-drive vehicle that can evade an occurrence of excessive understeer and oversteer in situations unintended by the driver, by appropriately controlling driving forces to be distributed to sub-drive wheels. The driving force distribution device of the four-wheeled vehicle controls driving force to be distributed to the rear wheels (Wr, Wr) by the clutch (10) for front-and-rear torque distribution so that the wheels (Wf, Wf) are main drive wheels and the rear wheels (Wr, Wr) are sub-drive wheels. The driving force distribution device is adapted to perform control to restrict the upper limit of the four-wheel drive torque based upon an estimated driving force and steering angle of the vehicle, when calculating four-wheel drive torque to be distributed to the rear wheels (Wr, Wr) by the driving force distribution device (10).

5 Claims, 4 Drawing Sheets

(51) Int. Cl.
  *B60K 28/16* (2006.01)
  *B60K 17/35* (2006.01)

(56) References Cited

U.S. PATENT DOCUMENTS

| | | | |
|---|---|---|---|
| 2008/0201051 A1* | 8/2008 | Yoneda | B60W 10/14 701/88 |
| 2008/0277182 A1 | 11/2008 | Heindl | |
| 2012/0010798 A1* | 1/2012 | Ito | B60K 23/0808 701/70 |

FOREIGN PATENT DOCUMENTS

| | | |
|---|---|---|
| JP | 07-94206 B2 | 10/1995 |
| JP | 4082548 B2 | 4/2008 |
| JP | 4082549 B2 | 4/2008 |
| JP | 2011-057154 A | 3/2011 |

OTHER PUBLICATIONS

Japanese Office Action dated Jan. 13, 2015, issued in cerresponding JP Patent Application No. 2013-527921 with English translation (6 pages).

Office Action dated Apr. 21, 2015, issued in corresponding Canadian Patent Application No. 2,844,803 (3 pages).

Office Action dated Jun. 13, 2014, issued in corresponding Japanese Patent Application No. 2013-527921, with English Translation (5 pages).

International Search Report for PCT/JP2012/065020, Mailing Date of Aug. 7, 2012.

Search Report dated Aug. 4, 2015 issued in counterpart Chinese Patent Application No. 201280038533.8 w/English translation (4 pages).

Search Report dated Aug. 4, 2015 issued in counterpart Chinese Patent Application No. 201280038533.8 w/English translation.

* cited by examiner

Without torque limit control

With torque limit control

Without torque limit control

With torque limit control

Without torque limit control

With torque limit control

Without torque limit control

With torque limit control

DRIVING FORCE CONTROL DEVICE FOR FOUR-WHEEL-DRIVE VEHICLE

DETAILED DESCRIPTION OF THE INVENTION

Technical Field

The present invention relates to a driving force control device for a four-wheel-drive vehicle that controls either driving force to be distributed to front wheels or driving force to be distributed to rear wheels so that either the front wheels (Wf, Wf) or the rear wheels (Wr, Wr) are main drive wheels (Wf, Wf) and the others are sub-drive wheels (Wr, Wr).

Background Art

Some conventional four-wheel-drive vehicles are equipped with an electronic control-type driving force control device as described in, for example, Patent Documents 1 and 2. The four-wheel-drive vehicles described in Patent Documents 1 and 2 control driving forces to be distributed to rear wheels by a driving force distribution device arranged between the front wheels and the rear wheels, thereby having the front wheels and rear wheels respectively as main wheels and sub-driving wheels. The driving force control device includes a control section (FI/AT ECU) for controlling an engine and an automatic transmission, and calculates the total driving force of the vehicle based upon engine speeds input to the FI/AT ECU, FI information such as intake pipe internal pressure and intake air quantity, and AT information such as gear stages and torque converter ratios. In such a way, the setting is made so as to output a driving torque of the rear wheels that is appropriate to the driving mode at the time. Furthermore, detecting the idling state of the front wheels (or the main drive wheels) by the wheel speed sensor, etc., and performing a control to increase a four-wheel-drive output torque (or a differential rotation control), this driving force control device secures the running performance on snow and a rough road and reduces the clutch slip to protect the clutch.

RELATED ART DOCUMENTS

Patent Documents

Patent Document 1: Japanese Patent No. 4082548
Patent Document 2: Japanese Patent No. 4082549

DISCLOSURE OF THE INVENTION

Problems to be Solved by the Invention

The above-described four-wheel-drive vehicle that distributes any torque to the sub-drive wheels is adapted to determine the driving force distribution ratio of the front and rear wheels and set the driving force (4WD controlled variable) to be distributed to the rear wheels (or sub-drive wheels), based upon the information such as the estimated driving force of the engine and the steering rudder angle (or the steering angle).

In contrast, some control devices of the four-wheel-drive vehicle with simpler structure perform no driving force distribution control based on the determination of the driving force distribution ratio of the front and rear wheels as described above. Such control devices run, transmitting the driving force only to the front wheels (or the main drive wheels) in a normal running condition, and perform a control to distribute the driving force to the rear wheels only if required.

However, the above-mentioned driving force control device that does not set controlled variables to the rear wheels (or the sub-drive wheels) based on the distribution ratio to front and rear wheels may not appropriately distribute the driving force to the rear wheels depending on the running conditions of the vehicle. For example, the grip limit in the front and rear directions (or driving and braking directions) decreases compared to when running straight, as the tire friction force acts not only in the direction of travel of the vehicle (or the front-and-rear direction) but also in the direction intersecting the direction of travel (or the lateral direction). Therefore, the wheels are likely to slip. In addition, in order to set appropriate controlled variables to the rear wheels for the road surface friction coefficient (or road surface μ) under various conditions such as the dry asphalt road surface, the frozen road surface, etc., it is necessary to appropriately perceive the friction coefficient of the road surface on which the vehicle is currently running. However, in the state where the vehicle is running on a high friction coefficient road surface such as the dry asphalt road surface (or in the grip running state), it is difficult to properly estimate the road surface friction coefficient depending on wheel speeds of the four-wheel-drive vehicle. Therefore, when setting the controlled variable of the rear wheels (or the driving force transmitted to the rear wheels) based on the road surface coefficient estimated from the wheel speeds of four-wheel-drive vehicle, the controlled variable of the rear wheels may become excessively large or small. This leads to a problem that an excessive oversteer due to the excessively-large controlled variable of the rear wheels and an excessive understeer due to the excessively-small controlled variable can possibly occur under conditions unintended by the vehicle driver.

In view of the above-mentioned problem, the present invention has an object to offer a driving force control device for a four-wheel-drive vehicle that can evade the occurrence of excessive understeer and oversteer under conditions unintended by a driver by appropriately controlling driving force distributed to the sub-drive wheels.

Means for Solving the Problem

In order to solve the above-mentioned problem, a driving force control device for a four-wheel-drive vehicle of the present invention can be characterized in a following way. The four-wheel-drive vehicle includes a driving force transmission path (20) for transmitting the driving force from a drive source (3) to front wheels (Wf, Wf) and rear wheels (Wr, Wr) and a driving force distribution device (10) arranged between the front wheels (Wf, Wf) or the rear wheels (Wr, Wr) in the driving force transmission path and the drive source (3). The driving force control device for such four-wheel-drive vehicle controls either driving force to be distributed to front wheels (Wf, Wf) or driving force to be distributed to rear wheels (Wr, Wr) by the driving force distribution device (10) so that either the front wheels (Wf, Wf) or the rear wheels (Wr, Wr) are main drive wheels (Wf, Wf) and the others are sub-drive wheels (Wr, Wr). The driving force control device includes a four-wheel drive torque calculation unit (50) for calculating a four-wheel drive torque to be distributed to the sub-drive wheels (Wr, Wr) by the driving force distribution device (10). The four-wheel drive torque calculation unit (50) performs control to restrict the upper limit of four-wheel drive torque to be distributed to the sub-drive wheels (Wr, Wr) based on an estimated driving force (61) of the vehicle and a steering angle (83) of the vehicle.

In this case, also, the upper limit of four-wheel-drive torque to be distributed to the sub-drive wheels (Wr, Wr) is a search value that is searched on a prepared map for upper limit restriction, based on the value of estimated driving force (61) of the vehicle and the value of steering angle (83) of the vehicle. The search value may have a tendency to becomes larger as the value of estimated driving force (61) of the vehicle becomes larger, and becomes smaller as the absolute value of steering angle (83) of the vehicle becomes larger.

The driving force control device for the four-wheel-drive vehicle in accordance with the present invention is adapted to perform control to restrict the upper limit of the four-wheel drive torque based on the estimated driving force and the steering angle of the vehicle, when calculating four-wheel drive torque to be distributed to the sub-drive wheels by the driving force distribution device. This enables to appropriately restrict the upper limit of the four-wheel drive torque based on the estimated driving force of the vehicle and the steering angle of the vehicle. Therefore, for instance, even if the road-surface condition is such that a road surface friction coefficient is difficult to be properly estimated based on the wheel speeds of the four-wheel-drive vehicle, an excessive oversteer due to excessively-large controlled variable to the sub-drive wheels and an excessive understeer due to the excessively-small controlled variable can be prevented from occurring under conditions unintended by the vehicle driver.

Specifically, for instance, when admitting that the wheels are slipping in the state where the estimated driving force of the vehicle is relatively small, the driving force control device can control so as to suppress the four-wheel drive torque to be distributed to the sub-drive wheels to be low, assuming that the vehicle is travelling on a relatively-low friction coefficient road surface (or a low μ road surface). In addition, even in the state where the steering angle, at which oversteer is likely to occur, is relatively large, the driving force control device can control so as to suppress the four-wheel drive torque to be distributed to the sub-drive wheels. Thus, the driving force control device can effectively prevent the four-wheel drive torque to be distributed to the sub-drive wheels from becoming excessive in the state where the vehicle turns when traveling on a low μ road surface. Therefore, the occurrence of excessive oversteer unintended by the driver can be evaded. The reference numerals and symbols in the above parentheses represent the reference numerals and symbols used for structural elements in an embodiment which will be described later, as an example of the present invention.

Effects of the Invention

With the driving force control device for the four-wheel-drive vehicle according to the present invention, the occurrence of excessive understeer and oversteer unintended by the driver can be evaded by appropriately controlling driving force to be distributed to the sub-drive wheels.

MODE FOR CARRYING OUT THE INVENTION

Figure 1:
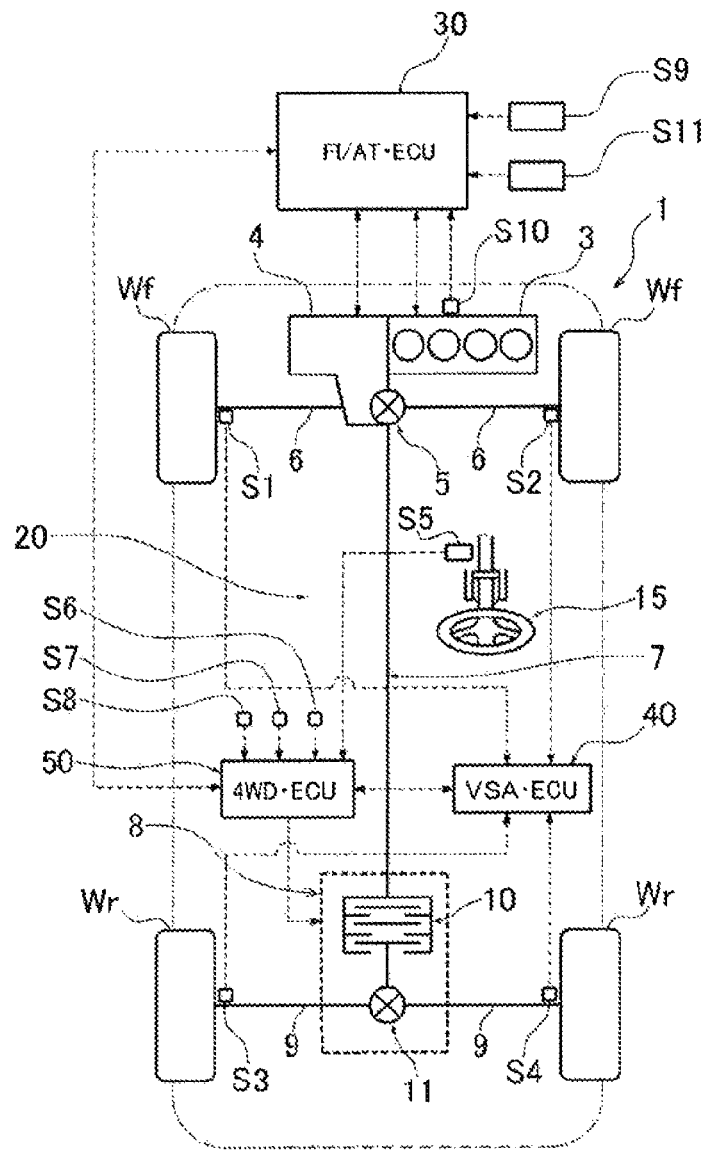
FIG. 1 is a diagram illustrating a schematic configuration of a driving force control device for a four-wheel-drive vehicle in accordance with an embodiment of the present invention.

Hereinafter, an embodiment of the present invention will be described in detail with reference to the appending drawings. FIG. 1 is a diagram illustrating a schematic configuration of a driving force control device for a four-wheel-drive vehicle in accordance with an embodiment of the present invention. The four-wheel-drive vehicle 1 as shown in the same figure includes an engine (or a drive source) 3 laterally installed on a front part of the vehicle, an automatic transmission 4 integrally arranged with the engine 3, and a driving force transmission path 20 for transmitting driving force from the engine 3 to front wheels Wf, Wf and rear wheels Wr, Wr.

An output shaft (not shown in the figure) of the engine 3 is coupled to the right and left front wheels Wf, Wf that are main drive wheels, via the automatic transmission 4, a front differential (hereinafter referred to as "front diff") 5, right and left front drive shafts 6, 6. Further, the output shaft of the engine 3 is coupled to the left and right rear wheels Wr, Wr that are sub-driving wheels, via the automatic transmission 4, the front diff 5, a propeller shaft 7, a rear differential unit (hereinafter, referred to as "rear diff unit") 8, and left and right rear drive shafts 9, 9.

The rear diff unit 8 is equipped with a rear differential (hereinafter, referred to as "rear diff") 11 for distributing the driving force to the left and right rear drive shafts 9, 9, and a clutch 10 for front and rear torque distribution for connecting/disconnecting the driving force transmission path from the propeller shaft 7 to the rear diff 11. The clutch for front and rear torque distribution 10 is a hydraulic clutch and a driving force distribution device for controlling the driving force to be distributed to the rear wheels Wr, Wr in the driving force transmission path 20. A 4WD ECU 50 that will be described later is adapted to perform drive control by controlling driving force to be distributed to the rear wheels Wr, Wr by the clutch 10 for front-and-rear torque distribution so that the front wheels Wf, Wf are main drive wheels, and the rear wheels Wr, Wr are sub-drive wheels.

In other words, when the clutch 10 is released (or disconnected), the rotation of the propeller shaft 7 is not transmitted to the rear diff 11 side, and the entire torque of the engine 3 is transmitted to the front wheels Wf, Wf. It leads to the front-wheel drive (2WD) state. On the other hand, when the clutch 10 is connected, rotation of the propeller shaft 7 is transmitted to the rear diff 11 side to distribute engine 3 torque both to the front wheels Wf, Wf and the rear wheels W3, W4. It leads to a four-wheel drive (4WD) state.

Further, the four-wheel-drive vehicle 1 is equipped with an FI/AT ECU 30, VSA ECU 40, and a 4WD ECU 50 that are control sections for controlling vehicle drive. In addition, the four-wheel-drive vehicle 1 is equipped with a left front wheel speed sensor S1 for detecting the wheel speed of the left front wheel Wf based on the rotation speed of a left front drive shaft 6, a right front wheel speed sensor S2 for detecting the wheel speed of the right-front wheel Wf based on the rotation speed of a right-front drive shaft 6, a left rear wheel speed sensor for S3 detecting wheel speed of the left-rear wheel Wr based on the rotation speed of a left-rear drive shaft 9, and a right rear wheel speed sensor for S4 detecting the wheel speed of the right-rear wheel Wr based on the rotation speed of the right-rear drive shaft 9. The wheel speed sensors S1 to S4 respectively detect wheel speeds VW1 to VW4 of the four wheel-drive vehicle. Detected signals of the wheel speeds VW1 to VW4 are adapted to be sent to the ECU 50.

Further, the four-wheel-drive vehicle 1 is equipped with a steering angle sensor S5 for detecting steering angles of a steering wheel 15, a yaw rate sensor S6 for detecting yaw rates of a car body, a lateral acceleration sensor S7 for detecting lateral acceleration of the car body, a speed sensor S8 detecting the vehicle body speed (or vehicle speed), etc. Detected signals from the steering angle sensor S5, the yaw rate sensor S6, the lateral acceleration sensor S7, and the speed sensor S8 are adapted to be sent to 4WD ECU 50.

The FI/AT ECU 30 is a control section controlling the engine 3 and the automatic transmission 4 and configured including a micro-computer consisting of a RAM, a ROM, a CPU, an I/O interface, etc. (none is shown in the figure). Detected signals of throttle opening (or accelerator opening) Th detected by a throttle opening sensor (or an accelerator opening sensor) S9, detected signals of engine rotation speed Ne detected by an engine rotation speed sensor S10, and detected signals of shift position detected by the shift position sensor S11 are adapted to be sent to the FI/AT ECU 30. Also, the FI/AT ECU 30 houses an engine torque map that records relationships among engine speed Ne, intake air quantity, and estimated value of engine torque Te, and is adapted to calculate the estimated value of the engine torque Te based on the intake air quantity detected by an air flow meter, engine speed Ne detected by the engine speed sensor S10, etc.

A VSA ECU 40 is a control section including a function as an ABS (or an Antilock Braking System) for preventing wheel lock when braking by performing anti-lock control of the front-and-rear and right-and-left wheels Wf, Wf and Wr, Wr, a function as a TCS (or a Traction Control System) for preventing wheel idling when accelerating the vehicle, and a function as a slip suppression system when turning. The VSA ECU 40 controls these three functions to performs vehicle behavior stabilization control. The VSA ECU 40 consists of a microcomputer as well as the above-described FA/AT-ECU 30.

The 4WD ECU 50 includes a microcomputer as well as the FA/AT ECU 30 and VSA ECU 40. The 4WD ECU 50 is coupled to the VSA ECU 40 and the FI/AT ECU 30. Therefore, detected signals from the above-described wheel speed sensors S1 to S4, the shift position sensor S10, etc., information of estimated value of engine torque Te, etc. are adapted to be input to the 4WD ECU 50 by a serial communication with the FI/AT ECU 30 and the VSA ECU 40. Depending on such input information, the 4WD ECU 50 calculates, as will be described later, driving force to be distributed to the rear wheels Wr, Wr (hereinafter referred to as "four-wheel drive torque") and a corresponding hydraulic pressure supply to the clutch 10 for front-and-rear torque distribution, based on a control program stored in the ROM, each flag value stored in the RAM, calculated values, etc. And, the 4WD ECU 50 outputs the driving signal based on the calculation result to the clutch 10 for front-and-rear torque distribution.

Figure 2:
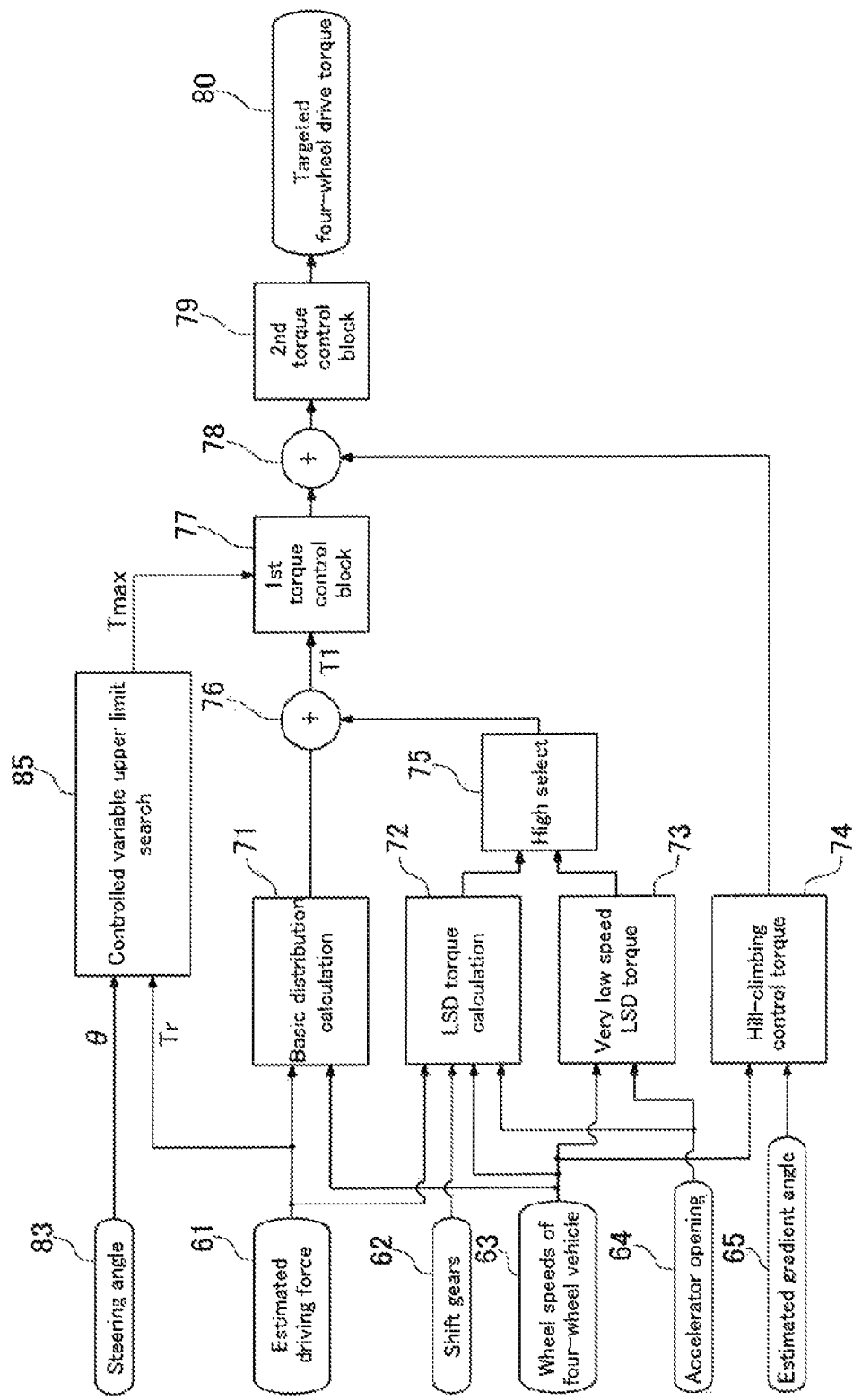
FIG. 2 is a block diagram illustrating a main logic for calculating four-wheel drive torques.

FIG. 2 is a block diagram illustrating a calculation process (or a main logic) of four-wheel drive torques. As shown in the same figure, when calculating four-wheel drive torques, the basic distribution of four-wheel drive torque (or basic distribution torque) to be distributed to the rear wheels Wr, Wr is firstly calculated by a basic distribution calculation block 71. The basic distribution of four-wheel drive torque is calculated based upon the pre-calculated estimated driving force 61 of the vehicle and the vehicle speed (or the four-wheel-drive vehicle speed) VW1 to VW4 of the front-and-rear and right-and-left wheels detected by the wheel speed sensors S1 to S4. The basic distribution of four-wheel drive torque can be set so as to become larger as the estimated driving force of the vehicle becomes larger, and to rise progressively depending on the estimated driving force of the vehicle. It should be noted that the estimated driving force (or the estimated driving torque) of the vehicle 61 is calculated based upon the estimated value of engine torque Te calculated in the above-mentioned FI/AT ECU 30 and the gear ratio that is determined from the shift position of the transmission.

Further, when calculating the four-wheel drive torque, a limited-slip differential torque (or LSD torques) that should be distributed to the rear wheel Wr, Wr is calculated by an LSD torque calculation block 72. The limited-slip differential torque here is such a drive torque as to be distributed to the rear wheels Wr, Wr depending on wheel speed differences (or differential rotations) between the front and rear wheels, in cases where the front wheels Wf, Wf slip when the vehicle starts as the friction coefficient of the road surface that the front wheels Wf, Wf grip is smaller than the friction coefficient of the road surface that the front wheels Wr, Wr grip, or in cases where the main driving force of the front wheels Wf, Wf is larger than the sub-driving force of the rear wheels Wr, Wr and thus the front wheels slip even if friction coefficients of the road surface that the four wheels grip are equal to each other, in comparison between front wheel Wf, Wf speeds and rear wheel Wr, Wr speeds. Such limited-slip differential torque is distributed to the rear wheels Wr, Wr via the clutch 10 for front-and-rear torque distribution and the rear diff 11, resulting in cancellation of the slip state of the front wheels Wf, Wf.

The limited-slip differential torque in the LSD torque calculation block 72 is calculated, by searching limited-slip differential torques (or indicated values) on the prepared limited-slip differential torque map (not shown in the figure), based upon the estimated driving force 61 of the vehicle and the accelerator opening 64, transmission shift gears 62 and the wheel speed difference (or the differential rotation) between the front and rear wheels and the vehicle speed (or the vehicle speed coefficient) obtained from the wheel speeds of the four-wheel-drive vehicle 63. Thus, the limited-slip differential torque that should be distributed to the rear wheels Wr, Wr for cancelling the slip state of the front wheels Wf, Wf is calculated.

Further, when calculating the four-wheel drive torque, the very low speed limited-slip differential torque (or the very low speed LSD torque) is calculated in a very low speed LSD torque calculation block 73. The very low speed limited-slip differential torque is the limited-slip differential torque that is used in situations where differential rotation between the front and rear wheels cannot be detected accurately and the normal limited-slip differential torque cannot be calculated, such as when the wheels are idling near the detection limit of the vehicle speed sensor immediately after the vehicle starts on a low μ road surface. The very low speed limited-slip differential torque is calculated based upon the wheel speed difference (or differential rotation) between the mean value of the wheel speeds VW1, VW2 of the right-and-left front wheels Wf, Wf and higher one of the vehicle speeds VW3, VW4 of the right-and-left rear wheels Wr, Wr, the vehicle speed (or the vehicle speed coefficient) to be determined from the wheel speeds of the four-wheel-drive vehicle 63, and the accelerator opening 64.

In addition, when calculating the four-wheel drive torque, hill-climbing control torque is calculated by a hill-climbing control torque calculation block 74. In other words, the hill-climbing control torque calculation block 74 calculates the hill-climbing control torque to be distributed to the rear wheels Wr, Wr in order to improve hill-climbing running performance on a hill-climbing road, based on the vehicle speed to be determined from the wheel speeds of the four-wheel-drive vehicle 63 and an estimated incline angle 65 calculated from the vehicle speed (or the vehicle speed coefficient) calculated from vehicle acceleration.

The high select block 75 compare the limited-slip differential torque calculated in the LSD torque calculation block 72 to the very low speed limited-slip differential torque calculated in the very low speed LSD torque calculation block 73 to select a higher value of them (high select processing).

Moreover, a former torque addition block 76 adds the basic distribution of four-wheel-drive torque that was calculated in the basic distribution calculation block 71 to a higher one of the limited-slip differential torque and the very low speed limited-slip differential torque that were selected in the high select block 75 to calculate a total value.

Figure 3:
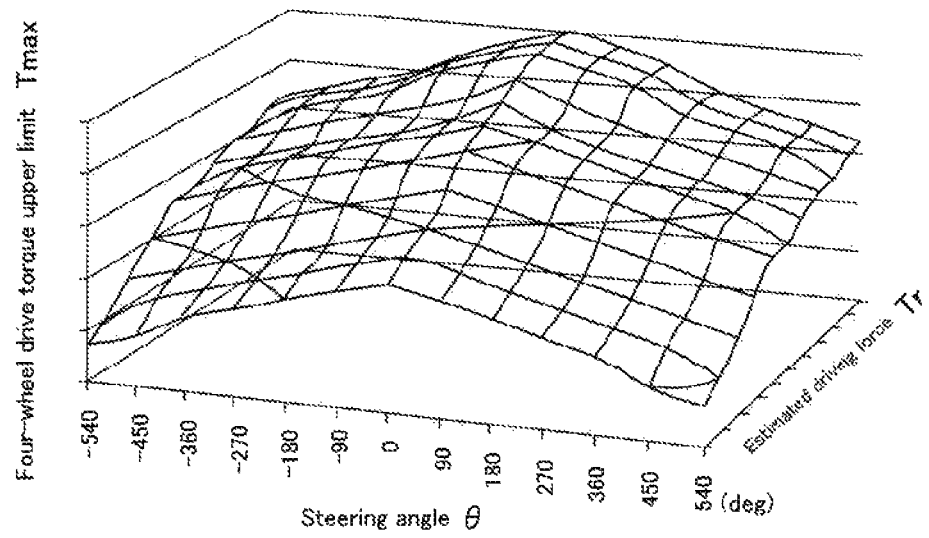
FIG. 3 is a graph illustrating an example of a map for the upper limit search that is used for torque limit control of four-wheel drive torque.
Figure 4A:
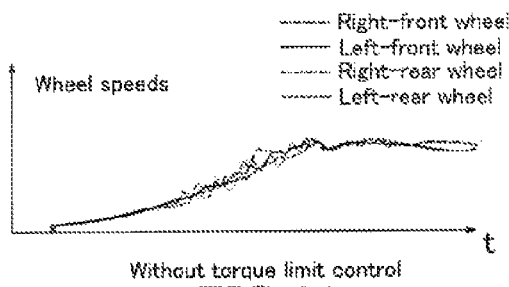
FIGS. 4A to 4H are graphs illustrating changes of wheel speeds of the four-wheel-drive vehicle, estimated driving forces, four-wheel drive torques (or indicated values), steering angles, and yaw rates when performing and not performing torque limit control of four-wheel drive torque.
Figure 4E:
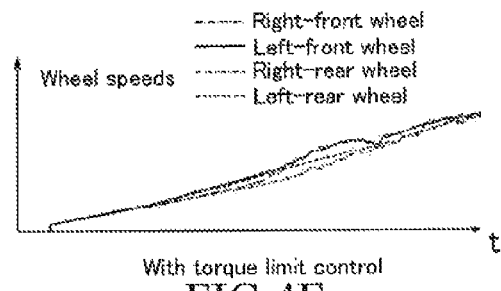
Figure 4B:
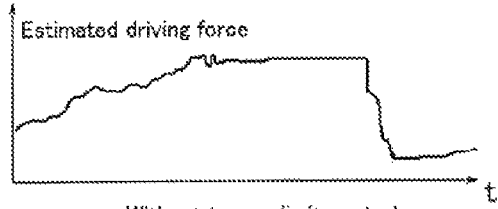
Figure 4F:
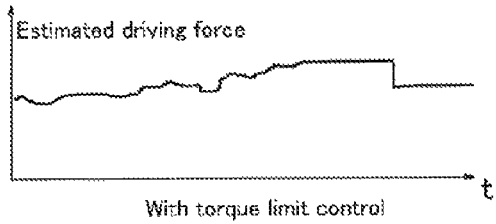
Figure 4C:
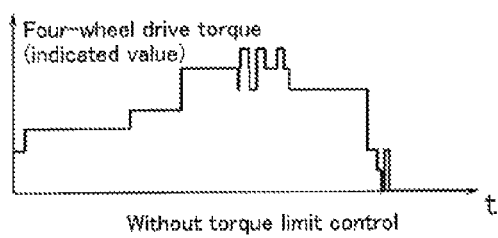
Figure 4G:
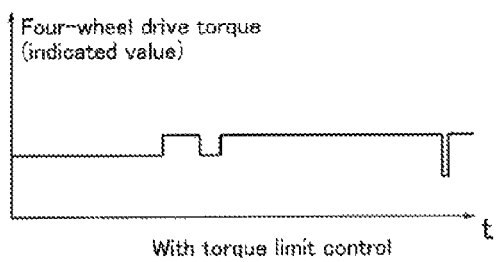
Figure 4D:
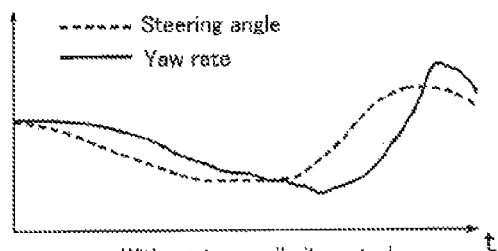
Figure 4H:
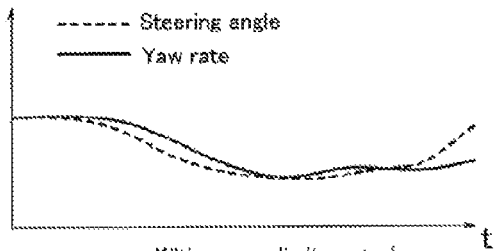

A first torque restriction block 77 performs control to restrict the upper limit of the four-wheel drive torque (hereinafter referred to as "torque limit control") based upon the steering rudder angles (or the steering angle). Hereinafter, the torque limit control will be described. FIG. 3 is a graph illustrating an example of a map for the upper limit search that is used for torque limit control of four-wheel drive torque. In the above-described torque limit control, the map for upper limit searches for searching upper limit Tmax of four-wheel drive torque as shown in FIG. 3 is prepared beforehand. The map for upper limit search is a three-dimensional map illustrating the distribution of the upper limit Tmax of four-wheel drive torque corresponding to the value θ of the steering angle 83 and the value Tr of the estimated driving force 61. The upper limit Tmax of four-wheel-drive torque on the map for upper limit search has a tendency to become larger as the value Tr of the estimated driving force 61 becomes larger, and smaller as the absolute value of steering angle θ becomes larger.

And, a controlled variable upper limit search block 85 as shown in FIG. 2 searches the upper limit Tmax of four-wheel drive torque on the map for upper limit search as shown in FIG. 3 based upon the value Tr of the estimated driving force 61 of the vehicle and the value θ of the steering angle 83. The search value Tmax is input to the first torque restriction block 77. The first torque restriction block 77 performs control to restrict the four-wheel drive torque T1 input from the torque addition block 76 at the search value Tmax. Specifically, the first torque restriction block 77 compares a four-wheel-drive torque T1 value calculated in the torque addition block 76 to the search value Tmax of the map for the upper limit search to select a lower one (low select processing).

A latter torque addition block 78 adds the driving torque (or the low select value) restricted in the first torque restriction block 77 to the hill-climbing controlling torque calculated in the hill-climbing controlling torque calculation block 74 to calculate a total value.

A second torque limit block 79 performs torque restriction (or protection torque control) that is required for protection of each mechanism on the path where the four-wheel-drive torque such as the rear diff 11 is transmitted, to the total value of four-wheel-drive torque calculated in the torque addition block 78. Specifically, the second torque limit block 79 compares the total value of four-wheel-drive torque calculated in the torque addition block 78 to the upper limit of four-wheel-drive torque that is required for protection the predetermined rear diff 11, thereby performing a processing of cutting what exceeds the upper limit (or a high-cut processing) when the total value of four-wheel drive torque is larger than the upper limit. Thus, a targeted value (or a targeted four-wheel drive torque) of the four-wheel drive torque 80 is calculated.

The 4WD ECU 50 calculates the hydraulic pressure supply to the clutch 10 for front-and-rear torque distribution, corresponding to the targeted four-wheel drive torque 80 calculated in the above-described step to output a driving signal based upon the calculation result to the front-and-rear torque distribution clutch 10. Thus, the 4WD ECU 50 controls engaging power of the front-and-rear torque distribution clutch 10 to control driving force to be distributed to the rear wheels W3, W4.

As described above, the four-wheel-drive vehicle 1 of the present embodiment is adapted to perform control to restrict the upper limit of the four-wheel drive torque based upon the estimated driving force and steering angle of the vehicle, when calculating the four-wheel drive torque to be distributed to the rear wheels (or the sub-drive wheels) Wr, Wr by the front-and-rear distribution clutch (or the drive distribution device) 10. This enables to properly restrict the upper limit of four-wheel drive torque based upon the estimated driving force and steering angle. Therefore, for instance, even in cases where the friction coefficient of a road surface is difficult to be properly estimated based on the wheel speeds of the four-wheel-drive vehicle, the four-wheel-drive vehicle 1 can effectively prevent an excessive oversteer due to an excessively-large controlled variable to the sub-drive wheels and an excessive understeer due to an excessively-small controlled variable to the sub-drive wheels from occurring in situations unintended by the driver.

FIGS. 4A to 4H include graphs illustrating changes in each of wheel speeds (of the right-front wheel, left-front wheel, right-rear wheel, and left-rear wheel) of the four-wheel-drive vehicle (FIG. 4A, FIG. 4E), estimated driving forces of the vehicle (FIG. 4B, FIG. 4F), four-wheel drive torques (indicated value) (FIG. 4C, FIG. 4G), and steering angles and yaw rates (FIG. 4D, FIG. 4H), when not performing torque limit control (FIGS. 4A to 4D) and when performing torque limit control (FIGS. 4E to 4H). As shown in the same figure, when performing torque limit control (FIGS. 4E to 4H), comparing to where not performing torque limit control (FIGS. 4A to 4D), the four-wheel drive torque exceeding the upper limit is cut. And when not performing torque limit control (FIGS. 4A to 4D), excessively-large torque acts on the rear wheels Wr, Wr due to an increase in the four-wheel drive torque, whereby yaw rate does not follow the steering angle, leading to oversteer. On the contrary, when performing torque limit control (FIGS. 4E to 4H), since excessively-large torque does not act on the rear wheels Wr, Wr due to suppression of an increase in four-wheel drive torque, the yaw rate follows the steering angle, leading to near-neutral steering. Also, in the graph of the figure, when performing torque limit control, comparing to when not performing torque limit control, there is a tendency that variation is small among the wheel speeds of the four-wheel-drive vehicle.

In other words, by restricting the upper limit of the four-wheel drive torque with the search value on the map for upper limit search as shown in FIG. 3, the four-wheel drive torque to be distributed to the rear wheels Wr, Wr can be controlled so as to be suppressed low, assuming that the vehicle is running on a relatively low friction coefficient road surface (or a low μ road surface) when a slip is observed to be occurring in cases where estimated driving force of the vehicle is relatively small. Moreover, also when the steering angle is relatively large, at which oversteer is likely to occur, the four-wheel drive torque to be distributed to the rear wheels Wr, Wr can be controlled so as to be suppressed low. Thus, in cases where the vehicle turns when running on a low μ road surface, an excessive distribution of four-wheel-drive torque to the rear wheels Wr, Wr can be effectively prevented. Accordingly, an occurrence of excessive oversteer unintended by the driver can be evaded.

In this manner, the four-wheel-drive vehicle 1 of the present enforcement restricts the upper limit of four-wheel drive torque, based upon the estimated driving force and steering angle of the vehicle, which enables to evade an occurrence of excessive oversteer due to excessively-large controlled variable to the rear wheels Wr, Wr and excessive understeer due to excessively-small controlled variable in situations unintended by the driver.

Although the embodiments of the present invention have been explained above, the present invention is not limited to the above embodiment. Various modifications can be made in a scope of the technical idea described in the following claims, the specification described above and the accompanying drawings without departing from the spirit and scope of the present invention.

The invention claimed is:

1. A driving force control device for a four-wheel-drive vehicle, the driving force control device controls either driving force to be distributed to front wheels or driving force to be distributed to rear wheels by a driving force distribution device so that either the front wheels or the rear wheels are main drive wheels and the others of the front wheels and the rear wheels are sub-drive wheels, the four-wheel-drive vehicle comprising a driving force transmission path for transmitting the driving force from a drive source to front wheels and rear wheels, and the driving force distribution device arranged between the front wheels or the rear wheels in the driving force transmission path and the drive source, the driving force control device comprising:

a four-wheel drive torque calculation unit for calculating a four-wheel drive torque to be distributed to the sub-drive wheels by the driving force distribution device, wherein the four-wheel drive torque calculation unit determines an upper limit of the four-wheel drive torque to be distributed to the sub-drive wheels using an estimated driving force of the vehicle and a steering angle of the vehicle, and imposes the determined upper limit on the calculated four-wheel drive torque to be distributed to the sub-drive wheels.

2. The driving force control device for the four-wheel-drive vehicle according to claim 1, wherein the upper limit of the four-wheel-drive torque to be distributed to the sub-drive wheels is a search value that is searched on a prepared map for upper limit restriction, based on the value of estimated driving force of the vehicle and the value of steering angle of the vehicle, and, wherein the search value is set to become larger as the value of estimated driving force of the vehicle becomes larger, and become smaller as the absolute value of steering angle of the vehicle becomes larger.

3. The driving force control device for the four-wheel-drive vehicle according to claim 1, wherein the four-wheel drive torque calculation unit calculates the four-wheel drive torque using the estimated driving force of the vehicle.

4. The driving force control device for the four-wheel-drive vehicle according to claim 3, wherein the four-wheel drive torque calculation unit estimates the driving force of the vehicle.

5. The driving force control device for the four-wheel-drive vehicle according to claim 1, wherein the four-wheel drive torque calculation unit determines whether the calculated four-wheel drive torque to be distributed to the sub-drive wheel exceeds the determined upper limit, and if so, selects the upper limit as the drive torque to be output to the sub-drive wheels.

* * * * *